Sept. 23, 1958  D. E. GOLAY  2,853,050
DEVICE FOR MEASURING MILK IN A MILKING SYSTEM
Filed July 1, 1957  3 Sheets-Sheet 1

INVENTOR-
DONAVEN E. GOLAY
By-Herbert A. Minturn
ATTORNEY

Sept. 23, 1958 D. E. GOLAY 2,853,050
DEVICE FOR MEASURING MILK IN A MILKING SYSTEM
Filed July 1, 1957 3 Sheets-Sheet 3

INVENTOR-
DONAVEN E. GOLAY
By-Herbert Q. Minturn
ATTORNEY

2,853,050
DEVICE FOR MEASURING MILK IN A MILKING SYSTEM

Donaven Edwin Golay, Cambridge City, Ind., assignor to Farmer Feeder Company, Inc., Cambridge City, Ind.

Application July 1, 1957, Serial No. 668,972

3 Claims. (Cl. 119—14.17)

In a mechanical system for milking cows, it is desirable in most installations to be able to measure the amount of milk produced by one individual cow at a milking. Many devices have heretofore been devised, such as is what is commonly known as a weigh jar which is more or less in the nature of a cylindrical bottle.

The less milk is splashed around and agitated the less damage is done to it. It does not take much agitation of the milk upon being dumped into a bottle to separate a part at least of the butter fat from the milk, and particularly does such agitation cause foaming of the milk which makes it difficult to handle through a pipe line particularly. Also where the milk is agitated in the presence of air, and the milk is not moved along from one location to another within a confined space within a reasonable length of time, the milk is apt to become rancid and of course its quality is then lowered.

Not only is the actual measuring of the milk been found to be a difficult problem, but also the cleaning of the measuring device enters into the picture because the weighing or measuring device must be kept in a sanitary condition and particularly be able to be cleaned readily following the end of the milking and measuring operations.

It is a primary purpose of this invention to provide a unique form of a measuring vessel which will receive the milk directly from the milking machine claw and deposit it in the vessel at the bottom end thereof regardless of the height of milk already in the vessel, permit the vessel to be rotated from an upright to a downturned position for emptying the milk and also for washing it after the measuring has been completed.

A still further important object of the invention resides in the structure embodying that invention wherein the device is relatively light in weight and may be supported adjacent the cow being milked when desired and may be readily removed from that location to other locations simply by disengaging frictionally attached tubes.

These and many other objects and advantages of the invention will become apparent to those versed in the art in the following description of one particular form of the invention as illustrated in the accompanying drawings, in which Fig. 1 is a view in side elevation of a device embodying the invention;

Figures 3, 4, 5:
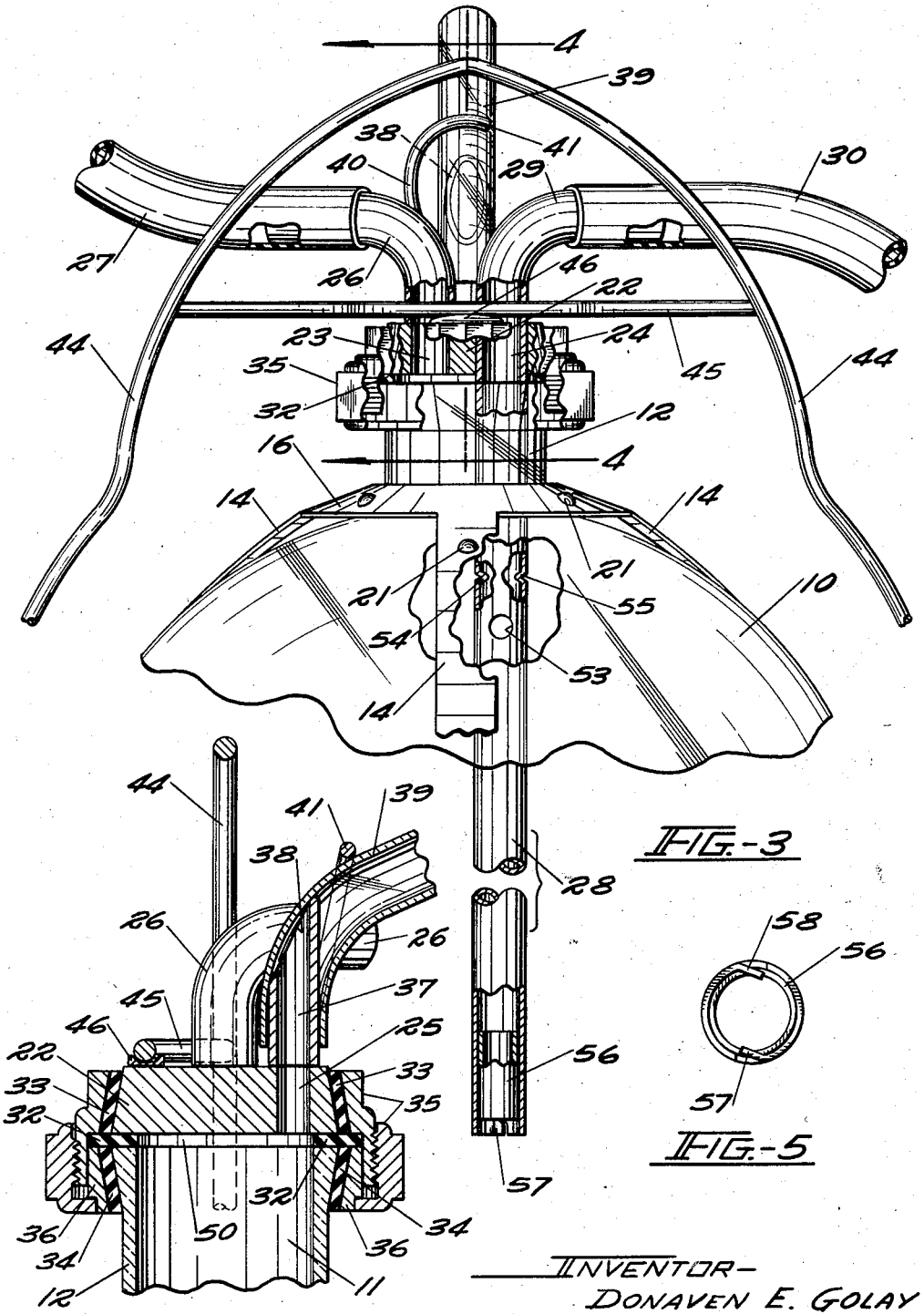
Fig. 3 is a view in detail in side elevation and partial section of the upper end portion of the structure and the lower end of a milk stand pipe member.
Fig. 4 is a detail in vertical section on a still further enlarged scale on the line 4—4 in Fig. 3.
Fig. 5 is a view in bottom plan on an enlarged scale of the stand pipe member.

A spherical glass vessel 10 has a single inlet and outlet opening 11, Fig. 4, through a neck 12. The vessel 10 is supported by a bottom ring 13 from which extends upwardly a plurality of straps 14, herein shown as three in number. Each of these straps herein shown is fixed to a centrally located horizontally positioned surrounding band 15. The straps 14 extend circumferentially around the vessel 10 to an upper yoke 16 to which they are united. The straps 14 are interrupted, herein shown as above the band 15 to be divided into upper and lower lengths tied together by means of a bolt 17 passing through outturned ends 18 and 19 of the respective lengths of the straps 14 and there secured by means of a nut 20. This interruption of the straps 14 is provided in order to permit the vessel 10 to be removed from support between those straps which hold the vessel 10 against the lower ring 13. The straps 14 as well as the central band 15 are spaced from the vessel 10 by means of intervening cushioning buttons 21. Likewise a pad 52 surrounds the upper edge of the ring 13 providing an intervening cushioning member between the vessel 10 and the ring 13.

A head 22 is provided with three vertically extending passageways entirely therethrough, designated by the numerals 23, 24, Fig. 3, and 25, Fig. 4. The head 22 carries an elbow 26 through which the passageway 23 extends. This elbow 26 is normally interconnected with a suitable source of substantially constant vacuum pressure by any suitable means such as by means of the attached flexible tube 27.

Figure 1:
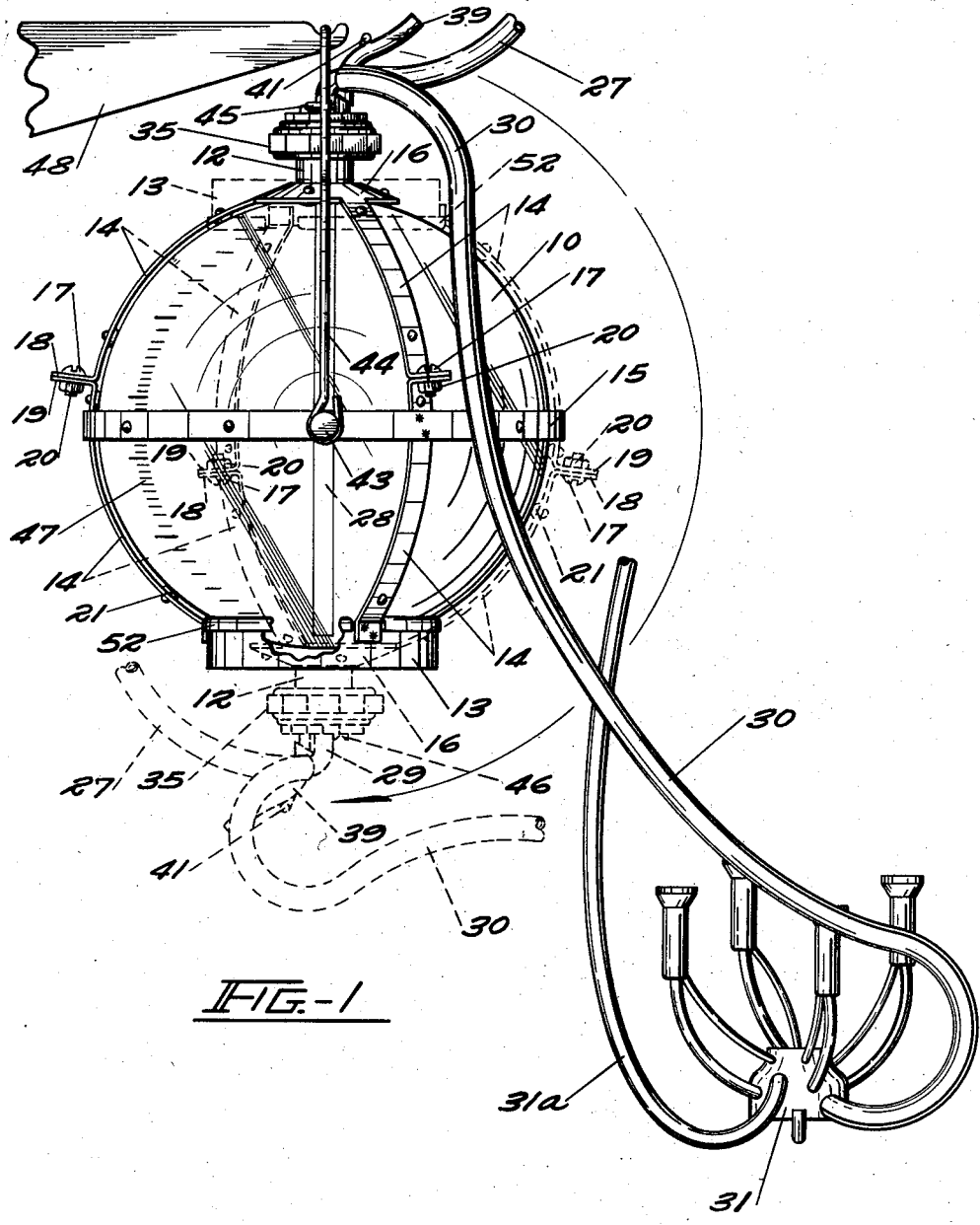

A pipe 28 is fixed to the head 22 in axial alignment with the passageway 24 and hangs downwardly within the vessel 10 a distance terminating just short of the diametrically opposite or bottom side of the vessel 10, Fig. 1. The clearance between the lower end of the pipe 28 and the inside of the vessel 10 should not exceed one-half of one inch for best results. An elbow 29 is fixed to the outer or top side of the head 22, and through which elbow 29 the passageway 24 continues as between the pipe 28 and an attached tube 30 which normally leads to the discharge side of the milking claw generally designated by the numeral 31, this claw 31 being connected in the usual manner with a vacuum pulsating line 31a.

Adjacent the upper end of the pipe 28, and positioned to be located within the vessel 10, there is provided a vacuum by-pass hole 53, extending transversely therethrough. A pair of inwardly extending abutments 54 and 55, Fig. 3, are located within the pipe 28 at a spaced distance above the hole 53, these abutments preferably being formed by peening or crimping the outer surface of the pipe 28. A shut-off tube length 56 slidingly fits within the pipe 28 and is prevented from being withdrawn therefrom by means of inwardly extending tongue portions 57 and 58 positioned at and being an integral part of the lowermost end of the pipe 28, Figs. 3 and 5. The tube length 56 slidingly travels longitudinally within the pipe 28 to be stopped in downward travel by the tongue portions or abutments 57 and 58 in the vessel upright position and by the abutments 54 and 55 in the vessel inverted position, thus closing off the hole 53 in that inverted position.

The head 22 is placed across the top end of the neck 12 with an intervening gasket 32, and then by means of split, frusto-conical washers 33 and 34, one surrounding a frusto-conical peripherial surface of the head 22 and the other surrounding a like surface at the end portion of the neck 12, the two washers 33 and 34 are compressibly engaged against those surfaces from the top and lower directions respectively by means of a union nut 35 forcing a rigid frusto-conical member 36 upwardly against the lower washer 34 while the body of the nut 35 pulls downwardly on the washer 33, Fig. 4. This particular connection between the head 22 and the neck 12 while necessary to the successful sealing of the vessel 10 between it, the milk line 30, and the vacuum line 27, does not form a part of the invention herein per se.

Figure 2:
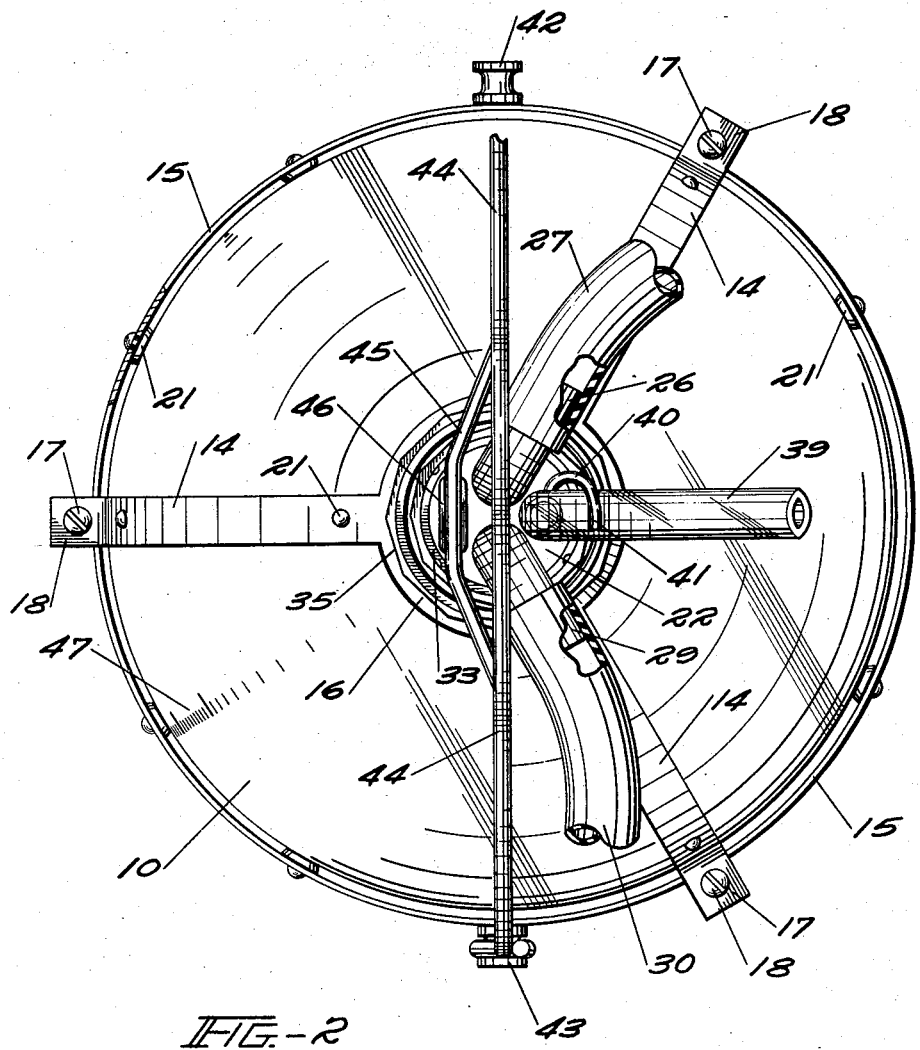
Fig. 2 is a view in top plan on an enlarged scale of the structure.

A hollow stem 37 is fixed to the head 22 aligned axially with the passageway 25 and terminates with a diagonally cut off upper end 38. A short length of a flexible tube 39 is frictionally engaged over the stem 37, and by means of a finger 40 which is fixed by one end to the head 22 and extends upwardly and beyond the extreme upper end of the stem 37 and thence curls over to one side thereof by an end portion 41, the tube 39 may be pulled into the position as indicated in Figs. 2 and 4 particularly where the tube 39 is carried across the diagonal end 38 to seal it off when the tube 39 is carried under the finger end 41. The sole purpose of this tube and stem arrangement is to provide a convenient, easily operated, and sanitary outlet for selectively withdrawing samples of milk from the vessel 10 for testing.

The band 15 carries a pair of trunnions 42 and 43 extending respectively from opposite diametrical zones of the band. A bail 44 has looped ends rockably engaging these trunnions 42 and 43, the bail being so formed that it may be carried into an upper position as indicated in the several views of the drawings, so that the entire vessel may be hung from any suitable member such as from a bracket or hook 48. The vessel 10 is preferably balanced so that it will normally remain in that position where the head 22 is uppermost. To insure the vessel 10 remaining in that position until it is desired to be shifted therefrom, the bail 44 is provided with a cross bar 45 which springs into the groove 46 provided across the topside of the head 22, Fig. 4. The bail 44 and its cross bar 45 are so proportioned that it will require the cross bar 45 to be forcibly entered by springing into the groove 46, and when so positioned, the bail 44 resists relative travel about its trunnions 42 and 43, and therefore will support the vessel 10 in the upright position as indicated in the several views.

In operation, the tube 27 will be connected to the usual vacuum supply line, such as the main milk line (not shown), whereby the interior of the vessel 10 and the claw member 31 are evacuated. This evacuation of the claw member 31 is had without any disturbance to the milk in the bottom of the vessel 10 since the evacuation thereof is performed above the milk level, that is, within line 27, within the vessel 10 above the milk livel, and through the by-pass hole 53 into the line 30. The claw 31 relieving the cow of milk discharges that milk through the tube 30 in view of the above mentioned evacvuation, through the passageway 24 of the head 22 and down the pipe 28 to discharge from its lower end immediately adjacent the floor of the vessel 10 which of course is spherical in nature. The milk will continue to flow into the vessel 10 as long as it is being obtained by the claw 31 from the cow, and at the end of the milking operation, the claw 31 may be shifted to the next cow in the usual manner. However before allowing milk from the next cow to flow through the tube 30 into the vessel 10, the amount of milk produced by the first cow is noted by reading the amount from the graduations 47 provided around the vessel 10, Fig. 1. And again, before the milk from the next cow is introduced into the vessel 10, the vessel 10 is rotated about its horizontal axis through the trunnions 42 and 43 by snapping the cross bar 45 from its retaining groove 46, permitting the vessel 10 to be completely inverted as indicated by the dash lines in Fig. 1. The tubes 27 and 30 remain attached to their respective elbows 26 and 29. When the vessel 10 is thus inverted and the teat cups are removed from the cow's udder to be exposed to the atmosphere, the quantity of milk within the inverted vessel 10 is pulled therefrom by force of vacuum through the line 27 and into the main milk line for later processing. That is, the milk is automatically withdrawn from the vessel 10 and into the main milk line upon inverting the vessel 10 as shown by the dash lines in Fig. 1. Following the dumping of the milk from the vessel 10, it is then rotated around to its upright position and the cross bar 45 is snapped into place across the groove 46 whereupon the next filling may be had.

After all of the milking operations are completed and the milk measured in each instance as above indicated, it is necessary to wash the system.

In the washing operation, the vessel 10 is again inverted to the dash line position, Fig. 1, as above explained. The line 30 remains connected between the claw 31 and the vessel 10 as above described, but the line 27 is removed from connection with the usual vacuum supply line, such as the main milk line, and is connected with an independent vacuum supply for this washing operation. The claw 31 is then immersed in the washing solution which is pulled into the vessel 10 through the line 30 and allowed to flow out from the end of the pipe 28 which is then directed upwardly so that the inflowing fluid will strike the topside of the vessel 10 and flow therearound cascading down the entire wall in a washing and wall-flooding manner so that the entire inner surface of the vessel 10 is washed down to the head 22, then on the under side of the vessel. The wash fluid is then automatically withdrawn from the vessel 10 through the line 27 by force of vacuum as above described in the milk dumping operation.

During this washing operation, upon inversion of the vessel 10 as above described, the shut-off tube length 56 slides longitudinally downwardly within the pipe 28 to be stopped by the abtuments 54 and 55, thus closing off the by-pass hole 53 to prevent the washing solution from squirting outwardly therefrom rather than traveling the entire length of the pipe 28.

It is to be noted that when the milk is unloaded from the vessel 10, the stand pipe 28 is directed upwardly with the by-pass hole 53 in its closed condition so that the milk does not lodge in it, but to the contrary goes out through the tube 27, and then when the vessel is being washed, the same situation exists in that the stand pipe 28 is again turned upwardly with hole 53 closed to secure the fountain or spray action of the rinsing and washing fluids from the outermost end thereof.

When the milk is flowing into the vessel 10, it discharges from the lower end of the pipe 28, and after the first entering small quantity, the milk discharges below the level of the milk in the container so that there is no splashing and churning of the milk to any appreciable extent, and little tendency to cause the milk to foam within the vessel 10.

Obviously the head 22 may be removed from the container neck 12 by releasing the union nut 35 and disassembling the various units and gasket and washers so that they may be individually scrubbed when necessary, although the only member exposed to the milk itself at anytime would be the inner circumferential margin 50 of the intervening gasket 32, and since it is a smooth wall preferably flush with the interior of the neck 12, it is readily washed off while in the assembled position.

Therefore it is to be seen that I have provided an extremely simple, most effective measuring device which may be quickly and thoroughly washed in position on the line with the minimum amount of exposed surface areas to the milk requiring the washing operation. It is obvious that structural changes may be employed without departing from the spirit of the invention, and I therefore do not desire to be limited to that precise form beyond the limitations which may be imposed by the following claims.

I claim:

1. The combination with a milking claw and a vacuumized milk flow line, of an approximately spherical, transparent, frangible milk measuring vessel having an entrance neck normally directed upwardly defining a vessel upright position; a vessel supporting base; means removably securing the vessel on said base; a bail rockably carried by the vessel; a head having two passageways therethrough and removably sealing off said neck; a milk tube carried by said vessel leading from said claw and discharging through one of said passageways into said vessel; a pipe fixedly carried by said head leading from said one passageway and opening by an end immediately above the side of the vessel opposite said head; said pipe having a side wall opening adjacent its end leading from said passageway; an abutment carried by said pipe on each side of said wall opening; a member carried by said pipe shiftable therealong under influence of gravity between said abutments; the shiftable member being arrested by one of said abutments to close off said wall opening when said vessel is in a position inverted from its normal upright position; said flow line being connected with said other passageway; milk from said claw being carried from said claw into said vessel when in its said upright position by evacuation of said vessel through said flow line; the milk flowing primarily as a column down said pipe across said pipe side opening and discharging from the pipe end over said vessel side thereunder below the level of an initial deposit of milk covering the pipe end; and, upon inverting the vessel by rotation about said bail, said milk being carried from the vessel into said flow line by entrance of atmospheric air into said claw, said air entering said vessel through said pipe end.

2. The structure of claim 1 in which said pipe end is spaced from said vessel side approximately one-half inches.

3. The structure of claim 1 in which said member comprises a tube open at both ends slidingly carried within said pipe.

References Cited in the file of this patent

UNITED STATES PATENTS

| | | |
|---|---|---|
| 1,519,826 | Fuge | Dec. 16, 1924 |
| 1,534,939 | Fuge | Apr. 21, 1925 |
| 1,745,309 | Norris | Jan. 28, 1930 |
| 2,007,250 | Kellner | July 9, 1935 |
| 2,117,780 | Wiersma | May 17, 1938 |
| 2,278,276 | Maddox | Mar. 31, 1942 |
| 2,677,348 | Domingo | May 4, 1954 |

FOREIGN PATENTS

| | | |
|---|---|---|
| 110,667 | Australia | May 22, 1940 |